(12) United States Patent
Cobb et al.

(10) Patent No.: US 11,477,177 B2
(45) Date of Patent: Oct. 18, 2022

(54) SECURE RFID TAG IDENTIFICATION

(71) Applicant: PRAGMATIC PRINTING LTD., Sedgefield (GB)

(72) Inventors: Brian Cobb, Sedgefield Durham (GB); Scott White, Sedgefield Durham (GB)

(73) Assignee: PRAGMATIC PRINTING LTD., Sedgefield Durham (GB)

( * ) Notice: Subject to any disclaimer, the term of this patent is extended or adjusted under 35 U.S.C. 154(b) by 0 days.

(21) Appl. No.: 16/646,008

(22) PCT Filed: Sep. 11, 2018

(86) PCT No.: PCT/GB2018/052577
§ 371 (c)(1),
(2) Date: Mar. 10, 2020

(87) PCT Pub. No.: WO2019/048892
PCT Pub. Date: Mar. 14, 2019

(65) Prior Publication Data
US 2020/0213286 A1 Jul. 2, 2020

(30) Foreign Application Priority Data
Sep. 11, 2017 (GB) ...................... 1714583

(51) Int. Cl.
*H04L 9/40* (2022.01)
*H04L 9/08* (2006.01)
(Continued)

(52) U.S. Cl.
CPC ........ *H04L 63/0492* (2013.01); *H04L 9/0863* (2013.01); *H04L 9/0869* (2013.01); *H04L 9/3236* (2013.01); *H04W 12/47* (2021.01)

(58) Field of Classification Search
CPC . H04L 63/0492; H04L 9/0863; H04L 9/0869; H04L 9/3236; H04W 12/47; H04W 12/06; G06K 19/07309
See application file for complete search history.

(56) References Cited

U.S. PATENT DOCUMENTS

| 10,079,825 B2* | 9/2018 | Rokhsaz ............. G06Q 20/382 |
| 2005/0149730 A1* | 7/2005 | Aissi ..................... H04L 9/3271 713/168 |

(Continued)

FOREIGN PATENT DOCUMENTS

| EP | 2960842 A1 | 12/2015 |
| KR | 2007-0006525 | 1/2007 |
| WO | WO 2015/008910 | 1/2015 |

OTHER PUBLICATIONS

Definition of data from britannica.com retrieved on Apr. 12, 2022.*
(Continued)

*Primary Examiner* — Thaddeus J Plecha
(74) *Attorney, Agent, or Firm* — Jason H. Vick; Sheridan Ross, PC

(57) ABSTRACT

A method, apparatus and system for secure one-way RFID tag identifications provided. The method comprising generating, at an RFID tag, an auxiliary identifier; generating, at an RFID tag, a secure representation based on the auxiliary identifier; transmitting, from the RFID tag and receiving at an RFID reader, one or more representations of the auxiliary identifier and the tag identifier including the secure representation; and verifying the identity of the RFID tag based on the received representations.

11 Claims, 11 Drawing Sheets

(51) Int. Cl.
*H04L 9/32* (2006.01)
*H04W 12/47* (2021.01)

(56) References Cited

U.S. PATENT DOCUMENTS

| | | | |
|---|---|---|---|
| 2009/0040023 A1* | 2/2009 | Pretorius | G06K 19/0723 340/10.1 |
| 2012/0064828 A1* | 3/2012 | Khan | H04W 12/068 455/41.1 |
| 2012/0161936 A1* | 6/2012 | Yoon | G06K 19/07309 340/10.1 |
| 2012/0207305 A1 | 8/2012 | Gallo et al. | |
| 2015/0071441 A1* | 3/2015 | Hinz | H04L 9/3271 380/270 |
| 2016/0110571 A1* | 4/2016 | Jung | H04L 9/3263 340/10.1 |
| 2016/0125208 A1* | 5/2016 | Van Eeden | G06K 7/10297 340/10.51 |
| 2017/0185761 A1* | 6/2017 | Stanwood | H04L 9/0863 |
| 2017/0279499 A1* | 9/2017 | Kadowaki | G06K 7/10297 |
| 2018/0196973 A1* | 7/2018 | Sun | H04L 9/0625 |

OTHER PUBLICATIONS

Definition of command from britannica.com retrieved on Apr. 12, 2022.*
International Preliminary Report on Patentability for International Application No. PCT/GB2018/052577, dated Mar. 26, 2020.
Cho, Jung-Sik, et al. "Securing Against Brute-Force Attack: A Hash-Based RFID Mutual Authentication Protocol Using a Secret Value" Computer Communications; vol. 34; pp. 391-397; 2011.
Henrici, Dirk et al. "Hash-Based Enhancement of Location Privacy for Radio-Frequency Identification Devices Using Varying Identifiers" IEEE Annual Conference on Pervasive Computing and Communications Workshops, 2004. Proceedings of the Second, Orlando, FL, USA, 2004, pp. 149-153.
International Search Report for International Application No. PCT/GB2018/052577, dated Nov. 22, 2018.
Written Opinion for International Application No. PCT/GB2018/052577, dated Nov. 22, 2018.
Search Report for corresponding Great Britain Patent Application No. 1714583.0, dated Feb. 28, 2018.
Lesjak, Christian "Design and Implementation of a Secure NFC-Based System for Mobile Electronic Coupons" Institut für Technische Informatik Technische Universität Graz; Aug. 2013.
Office Action for corresponding European Patent Application No. 18774103.8, dated Dec. 23, 2021.
Examination Report for corresponding Great Britain Patent Application No. 1714583.0, dated Nov. 3, 2021.

* cited by examiner

SECURE RFID TAG IDENTIFICATION

CROSS REFERENCE TO RELATED APPLICATIONS

This application is a national stage application under 35 U.S.C. 371 of PCT Application No. PCT/GB2018/052577, having an international filing date of 11 Sep. 2018, which designated the United States, which PCT application claimed the benefit of Great Britain Application No. 1714583.0, filed 11 Sep. 2017, each of which are incorporated herein by reference in their entirety.

FIELD OF THE INVENTION

The present invention relates to secure Radio Frequency Identification (RFID), and in particular, methods, apparatus and systems for secure one-way RFID tag identification.

BACKGROUND OF THE INVENTION

Radio Frequency Identification (RFID) has been in widespread use for a number of years in a range of applications, from asset tracking to personal identification and contactless payments for example. RFID operates over a range of frequencies including, among others, low frequency (LF—125-134 kHz), high frequency (HF—13.56 MHz) and ultra-high frequency (UHF—433 and 860-960 MHz), and a range of protocols may be used within each frequency range. Near Field Communications (NFC) is a subset of HF RFID which uses a particular set of protocols and is suited for close proximity communications, such as contactless taps used as part of contactless payments that are now commonly used. The adoption of NFC use has increased in recent years due to the reduced cost of NFC readers and also the increase in short-range applications. In both NFC and the broader range of RFID implementations, tags may communicate bidirectionally or may communicate in only a single direction (tag to reader), which is commonly referred to as tags talk only.

Although security such as encryption may be used to secure RFID transmissions or the data itself, this commonly involves bidirectional tags and can lead to significant increases in the complexity and thus cost of RFID tags, therefore making it undesirable for applications where low cost and security are required. Furthermore, tag cloning may not be prevented by such an approach. Due to these limitations, the use of RFID tags in large volumes is generally restricted to scenarios where security is a relatively low priority and/or cost is not a key concern.

In view of the shortcomings in terms of security associated with tags talk only RFID tags, there is a need for reduced complexity tags talk only RFID tags that provide improved protection against the cloning and creation of false tags, and also the repeated use of tag information in a fraudulent manner.

BRIEF SUMMARY OF THE DISCLOSURE

Advantageously, examples of the present disclosure provide approaches to increasing the security of tags talk only (TTO) RFID tags. In particular, examples of the present disclosure increase security through the prevention and/or detection of cloned and falsified TTO RFID tags, and the repeated use of data from TTO RFID tags.

In accordance with an aspect of the present disclosure, a method of operating a system for secure one-way RFID tag identification, the system comprising an RFID tag reader, and an RFID tag including a memory storing a tag identifier of the RFID tag, is provided. The method comprises: generating, at the RFID tag, an auxiliary identifier; generating, at the RFID tag, a secure representation based on the auxiliary identifier; transmitting, from the RFID tag and receiving at the RFID reader, one or more representations of the auxiliary identifier and the tag identifier including the secure representation; and verifying the identity of the RFID tag based on the received representations.

The generation of a new auxiliary identifier and its use in generating a secure representation enables a reader-side device to verify whether the secure representation originates from an authentic tag, and also to verify whether the auxiliary identifier has previously been used in a read operation associated with the tag, thus enabling the detection of the repeated use of previously read data.

In accordance with an example of the present disclosure, the auxiliary identifier is one of a random number and a number in a predetermined sequence.

In accordance with an example of the present disclosure, verifying the identity of the RFID tag includes determining if the auxiliary identifier has previously been used in verification of the identity of the RFID tag, and returning an unverified result if the auxiliary identifier has previously been used.

In accordance with an example of the present disclosure, the RFID tag stores a security key in a secure memory and the secure representation is generated based on the auxiliary identifier and the security key.

In accordance with an example of the present disclosure, the one or more representations include unsecured representations of the auxiliary identifier and the tag identifier, and the verifying the identity of the RFID tag includes: retrieving a counterpart security key corresponding to the received tag identifier; generating a counterpart hash based on the received tag identifier, the received auxiliary identifier and the retrieved security key; and comparing the received hash and the counterpart hash to verify the identity of the RFID tag.

In accordance with an example of the present disclosure, the secure representation is an encrypted value.

In accordance with an example of the present disclosure, generating the secure representation includes encrypting the auxiliary identifier and the tag identifier using the security key.

In accordance with an example of the present disclosure, verifying the identity of the RFID tag includes: retrieving a counterpart security key; and decrypting the received secure representation to obtain the auxiliary identifier and the tag identifier.

In accordance with an example of the present disclosure, the one or more representations includes an unsecured representation of the auxiliary identifier, and generating the secure representation includes generating a value based on the security key and the auxiliary identifier, and encrypting the tag identifier using the generated value.

In accordance with an example of the present disclosure, the value is generated using a one time password algorithm.

In accordance with an example of the present disclosure, verifying the identity of the RFID tag includes: retrieving a counterpart security key; generating counterpart value based on the counterpart security key and the unsecured representation of the auxiliary identifier; and decrypting the received secure representation using the counterpart value to obtain the tag identifier.

In accordance with an example of the present disclosure, the one or more representations include an unsecured representation of the tag identifier.

In accordance with an example of the present disclosure, the verification of the RFID tag is performed at the RFID tag reader or by an external provider and the verification result returned to the RFID tag reader.

In accordance with an example of the present disclosure, the RFID tag is a passive RFID tag.

In accordance with an example of the present disclosure, generation of the auxiliary identifier and the secure representation are performed in response to receiving power from the RFID tag reader.

In accordance with an example of the present disclosure, a new auxiliary identifier is generated for each transmission to the RFID reader.

In accordance with an example of the present disclosure, the secure representation is further based on one or more of the tag identifier and further information stored in the memory of the RFID tag.

In accordance with an example of the present disclosure, the method further comprises transmitting, from the RFID tag to the RFID tag reader, further information stored in the memory of the RFID tag.

In accordance with an example of the present disclosure, the further information includes one or more of URL information, manufacturer information, error detection coding, error correction coding, and data formatting information.

In accordance with an aspect of the present disclosure, a method for operating an RFID tag for secure one-way RFID tag identification, the RFID tag including a memory storing a tag identifier of the RFID tag, is provided. The method comprises: generating an auxiliary identifier; generating a secure representation based on the auxiliary identifier; transmitting one or more representations of the auxiliary identifier and the tag identifier including the secure representation.

In accordance with an aspect of the present disclosure, a method for operating an RFID tag reader for secure one-way RFID tag identification is provided. The method comprises: receiving one or more representation of an auxiliary identifier and a tag identifier of the RFID tag, including a secure representation based on the auxiliary identifier of the RFID tag; and verifying the identity of the RFID tag based on the received representations.

In accordance with an aspect of the present disclosure, an RFID tag for secure one-way RFID tag identification is provided. The RFID tag comprises a memory configured to store a tag identifier of the RFID tag; an auxiliary identifier generator configured to generate an auxiliary identifier; a cryptographic unit configured to generate a secure representation based on the auxiliary identifier; and a transmitter configured to transmit one or more representations of the auxiliary identifier and the tag identifier including the secure representation.

In accordance with an aspect of the present disclosure, an RFID tag reader for secure one-way RFID tag identification is provided. The RFID tag reader comprises a receiver configured to receive one or more representations of an auxiliary identifier and a tag identifier of the RFID tag, including a secure representation based on the auxiliary identifier; and a verification unit configured verify the identity of the RFID tag based on the received representations.

In accordance with an aspect of the present disclosure, an RFID system for secure one-way RFID tag identification is provided. The system comprises an RFID tag reader and an RFID tag, wherein the system is configured to implement any of the foregoing methods.

BRIEF DESCRIPTION OF THE DRAWINGS

Embodiments of the present invention are further described hereinafter with reference to the accompanying drawings, in which.

DETAILED DESCRIPTION

Figure 1:
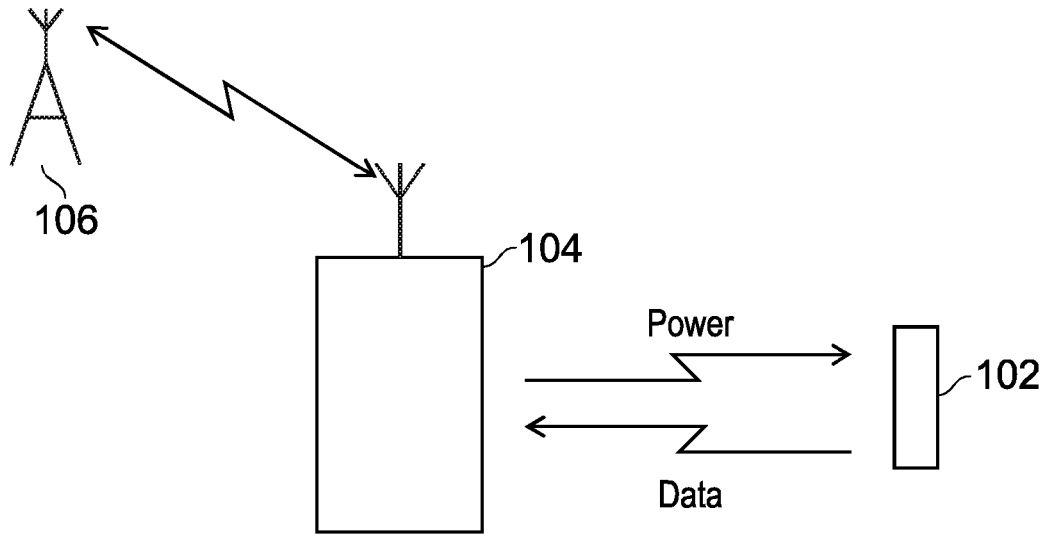
FIG. 1 provides a schematic diagram of an example passive tags talk only (TTO) RFID system.

Radio Frequency Identification (RFID) tags may be used in a wide range of different scenarios and therefore there are number of different types of RFID tags, each of which operate in a different manner. For example, RFID tags may be passive, semi-passive, or active, where passive RFID tags do not have an internal power source, semi-passive tags have an internal power source (e.g. a battery) for powering the circuitry of the tag but not for powering transmissions, and active RFID tags include an internal power source for powering both the circuitry and the transmissions of the tag.

Passive RFID tags obtain power from a reader device which provides power via radio frequency electromagnetic field/waves, where the exact transmission mechanism may vary depending on distance between the reader and the tag (i.e. near-field or far-field). The received power is suitably processed and then provided to the internal components of the RFID tag for data generation and/or transmission. Due to the absence of an internal power source, passive RFID tags typically have a range shorter than that of active tags and thus the reader device is required be within a short distance of the tag (e.g. less than 1 m for HF RFID tags and less than 10 m for UHF RFID tags); however, the lack of an internal power source increases their simplicity and thus they generally have a lower manufacturing cost, making them suitable for use on a large scale and for disposable or one time use applications. Consequently, the main use of passive RFID tags is in the identification of products, items and people for example. The absence of an internal power source also typically enables passive RFID tags to be smaller than active RFID tags.

Active RFID tags have an internal power source and thus generally have a significantly longer read range (e.g. more than 10 m) compared to passive RFID tags, as well as having the ability to have more complex circuitry on the tag, such as sensors etc. which require power to operate. Although active RFID tags may have increased functionality, they are significantly more expensive to manufacture than passive RFID tags, thus limiting their application to higher value tasks such as location and environmental monitoring for example. Active RFID tags may continually transmit a signal conveying data or may only transmit a signal when they come within range of a suitable reader in order to conserve power.

Both passive and active RFID tags may be of a tags talk only (TTO) variety or bi-directional variety. In the TTO variety, the RFID tag being read does not receive data from the reader but only transmits data to the reader (one-way communications), and in the bi-directional variety data is exchanged in both directions between the reader and the RFID tag. Throughout the present disclosure, passive TTO RFID tags are primarily considered; however, the disclosed techniques and systems are equally applicable to active RFID tags and/or bi-directional RFID tags. Furthermore, although RFID readers primarily are referred to, NFC compatible devices may also be used to interact with the RFID tags in accordance with the disclosed techniques.

FIG. 1 provides a schematic illustration of an example passive TTO RFID system, where the system comprises a passive RFID tag 102, an RFID tag reader 104, and an external communications system 106. In operation, the RFID reader 104 firstly provides power to the RFID tag 102, and on receipt of the power the RFID tag transmits a signal to the reader based on data stored in its memory and/or generated data. On receipt of the data at the reader 104, the reader may perform some form of verification or analysis on the received data or alternatively communicate the data to another entity such as a server or central controller for processing via the external communication system 106, which may be a wireless communication system such as a WLAN or cellular system, or a wired communication system such as LAN. The reader may be a dedicated RFID or NFC reader device, a multipurpose electronic device such as a smartphone or tablet computer, or any other device suitable for reading and performing/enabling verification of the data received from the RFID tag 102.

The data transmitted by the RFID tag 102 may include a wide variety of different things but most commonly it will include an identifier of the tag (Tag ID, Unique Tag ID (UID) etc.), where a tag ID may correspond to a particular product or location as set out in a database or the like. For example, in terms of product tracking, each product may be fitted with an RFID tag so that every product can be identified by virtue of the identity of the RFID tag that it is associated with. Other examples of data transmitted by RFID tags include advertisement information, web addresses, data sensed by sensors in the tag, data generated in calculations or other operations by the tag, or any other data that is commonly provided by barcodes or QR codes.

Figure 2:
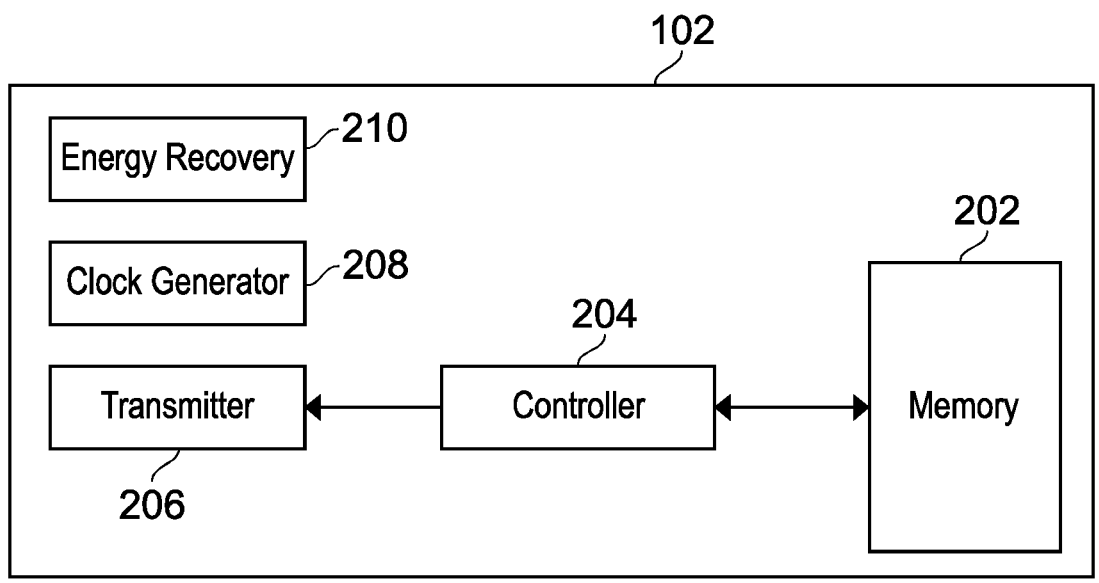
FIG. 2 provides a schematic diagram of a passive TTO RFID tag.

FIG. 2 provides a schematic diagram of the passive RFID tag 102. The passive RFID tag includes a memory 202 for storing data such as a tag ID; a controller, processor, state controller or the like 204 for controlling the operation of RFID tag and other processing tasks; a transmitter 206 for transmitting data to the reader; a clock generator 208 for providing clock signals to enable operation of one or more of the memory 202, controller 204 and transmitter 206; and an energy recovery unit 210 for receiving power transmitted by a reader and converting it into a form suitable for powering the various elements of the RFID tag 102.

As illustrated in FIG. 2, although only the memory, controller and transmitter are shown to be communicatively linked, the other elements of the RFID tag may also communicate with each other. Furthermore, although shown as a single element, the energy recovery unit 210 may be formed from several components such as an energy storage unit, and a rectifying unit for example. Likewise, the RFID tag may include further elements depending on the functionality and application of the RFID tag. The memory 202 may take any form but is most commonly ROM or PROM which does not require power to store data. However, the memory or controller may also have memory in the form of registers and RAM for temporarily storing data during data processing and prior to transmission of data to a reader, or non-volatile reprogrammable memory. Furthermore, the memory may also include secure and non-secure portions, where the secure portions store data in such a manner that it cannot be read by or transmitted to a reader. Likewise, the processor may include a secure element for processing of the data stored in the secure memory or a portion of secure memory.

In operation, on receipt of power from an RFID reader, the energy recovery unit 210 will recover, convert and possibly store received energy so that it may be used by the other components of the RFID tag. Once provided with power, the controller may read data from the memory and/or generate data and then provide it to the transmitter for transmission to the reader. The transmission of data may take several different forms and therefore will not be described in detail here; however, these different forms may include conventional RF transmissions and transmission via altering the properties of an antenna and/or reflected signals whereby the differing properties can be detected by the reader.

As set out above, passive RFID tags may be used to convey data such a tag ID; however, they are not limited to this. For example, a passive RFID tag may transmit any data that can be stored/generated on a tag. Given the ability to store and transmit data of any nature, several standards have emerged which enable data to be transmitted in a standard format such that data can be read and interpreted by a reader. One such example is the NFC barcode, which is a specification that sets out a particular formatting/structure/transmission of data that should be used when transmitting data from an RFID tag or NFC compatible device.

Figure 3:
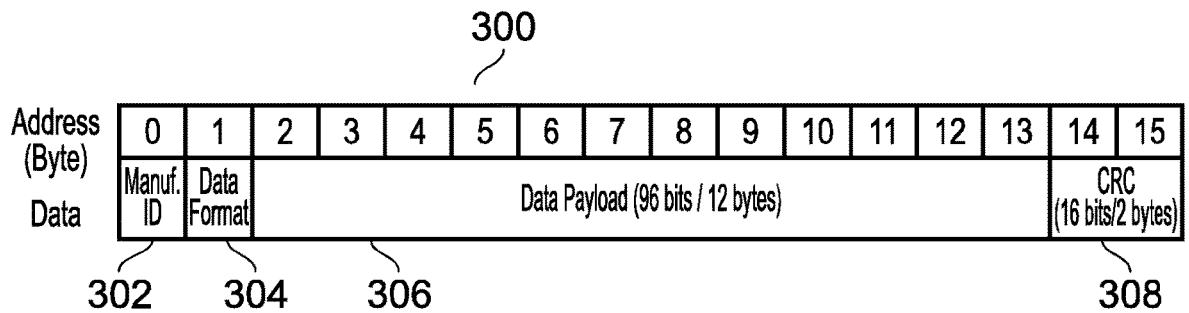
FIG. 3 provides a diagram of the data structure of an NFC barcode transmission.

FIG. 3 illustrates the structure of an RFID transmission in accordance with the NFC barcode structure, where the barcode is 16 bytes (128 bits) in length and is divided into several regions, such that when the data is received by a reader it can correctly identify what different elements of the data relate to. More specifically, the data structure 300 of FIG. 3 specifies that byte 0 provides a manufacturer ID 302, byte 1 specifies further information on the formatting of the data 304, bytes 2 to 13 carry the payload data 306, and bytes 14 and 15 provide the bits of a cyclic redundancy check (CRC) 308 for performing error detection on the received data 308. Although the payload data may be configured to include a range of different types of data, the most common element will be some form of tag ID.

Although the NFC barcode structure of FIG. 3 provides flexibility in the data that it may carry, there are a number of shortcomings with this and other data formats that may be transmitted via passive RFID tags. In particular, since the data in the payload is raw unencoded/unsecured data, RFID tags transmitting such data are vulnerable to cloning, where the data of the tag is read and a new identical tag created, or the creation of false tags based on the read data. For example, if RFID tags are being used for the identification and authentication of goods, non-authentic goods could be provided with a cloned tag by reading an authentic tag and creating a corresponding cloned tag which is then attached to the non-authentic good. Similarly, false tags may be created by reading the data from an authentic tag, altering the read data and then creating a tag based on the altered data.

Approaches to reduce the likelihood of RFID tag cloning have been proposed but these relate to bi-directional passive RFID tags and involve relatively complex encryption techniques, both of which are unsuitable for passive TTO RFID tags, especially for large volume applications where the low cost of production of the RFID tags is important.

Consequently, an approach for increasing the difficulty of cloning and increasing the security of TTO passive RFID tags is required.

In accordance with an example of the present disclosure, improving the security of TTO passive RFID tags is achieved by introducing a cryptographic element into the data which is transmitted to the reader and also a varying auxiliary identifier (auxiliary ID, seed, verification ID etc.) associated with each tag ID.

More specifically, each time a read operation is performed on an RFID tag, a new auxiliary ID is generated and a secure representation based on at least the tag ID and/or the auxiliary ID is transmitted to the reader. Additionally, depending on the implementation chosen, one or more unencrypted types/representations of tag data may also be transmitted to the reader along with the secure representation.

The auxiliary ID may take any form in which it changes for at least each new read operation and where the chance of repetition satisfies a predetermined level. For example, the auxiliary ID may take the form of a randomly generated number or a chain of sequential numbers (i.e. a counter), where the range of random numbers/counter is chosen to achieve a predetermined chance of a repeated value being generated within a fixed number of read/transmission operations. For example, the longer the length of the auxiliary ID the lower the chance that a repeated value will be generated for a set number of read operations. As is explained in more detail below, the use of a changing auxiliary ID enables the use of cloned data/reuse of previously read data to be detected.

The role of the secure representation is to provide a representation based on one or more of the tag ID, the auxiliary ID or further tag information which is resistant to tampering and preferably can only be generated by someone in possession of the tag, and in some examples, preventing RFID tag information from being read at all by an unauthorised user. In turn, these properties enable verification of certain elements of the tag. For example, they can be used to indicate that a generating entity has access to private information of the tag, that the secure representation and the tag ID/auxiliary ID originate from the same tag, and that the generator has access to information corresponding to information held at a central server etc.

The role of the auxiliary ID is to provide detection of repeated use of data which has been read from a tag. For example, without a changing auxiliary ID, duplicating a tag without being able to generate/access the secure representation may be achieved by simply reusing data previously transmitted by a tag or by programming data read from one tag onto another tag. However, by virtue of including an auxiliary ID which is associated with a particular tag ID and where the auxiliary ID changes from read to read, a falsified tag may be detected via detecting a repeated use of an auxiliary ID in connection with a particular tag ID.

The validity of a tag read may be assessed in a number of ways depending on how the secure representation and auxiliary ID are utilised. For example, the secure representation transmitted from the tag may be compared against a counterpart secure representation at the reader side, or simply the ability to access the data within the secure representation at the reader side may indicate that it has been generated by an authentic tag.

Figure 6:
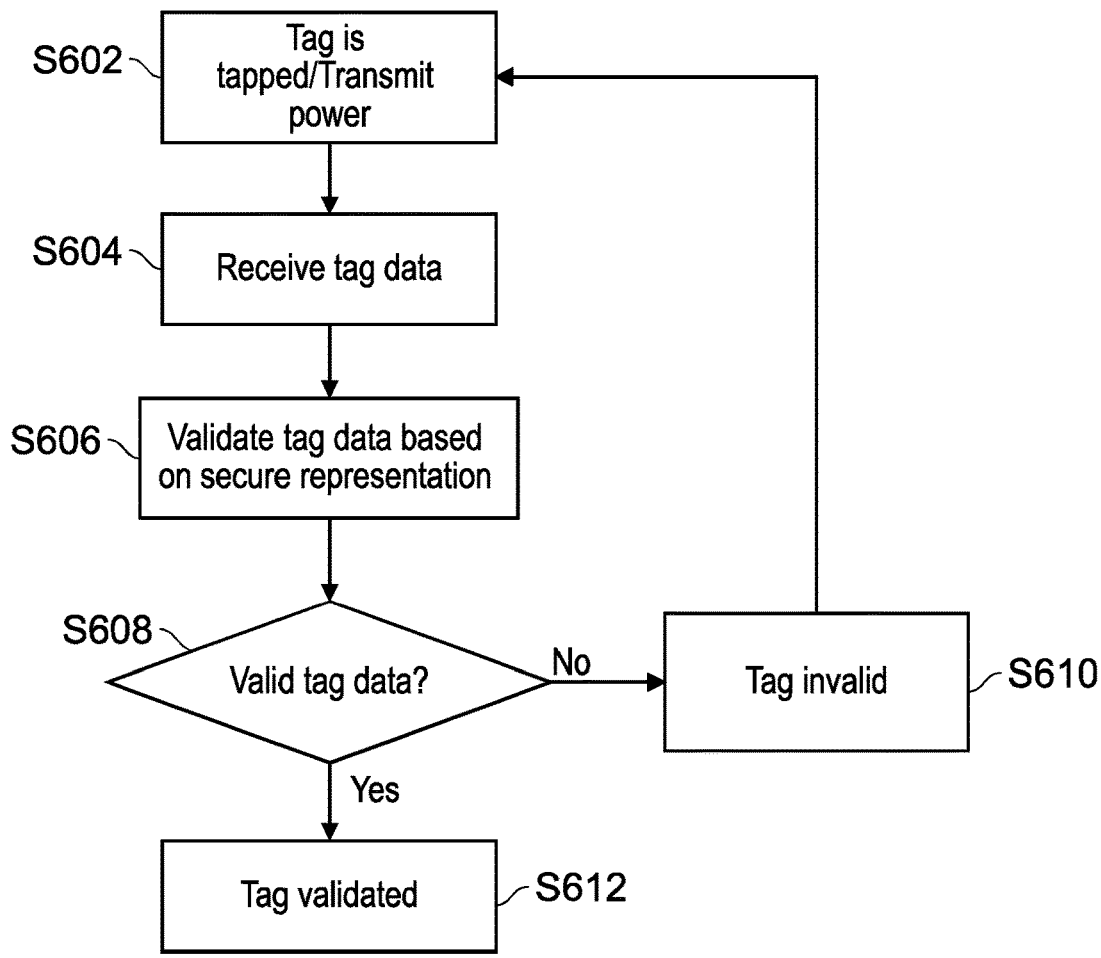
FIG. 6 provides a flow diagram of the receiver-side operations in a passive TTO RFID system operating in accordance with an example of the present disclosure.

In accordance with the present disclosure, although not limited to these approaches, there are two main cryptographic approaches to the generation of the secure representation that are considered by the present disclosure, the use of hashing and the use of encryption, where each of these approaches is explained in turn below. However, FIGS. 4 and 6 provide generalised approaches to a secure TTO passive RFID tag implementation, where FIG. 4 illustrates the tag-side steps and FIG. 6 illustrates the reader-side steps.

Figure 4:
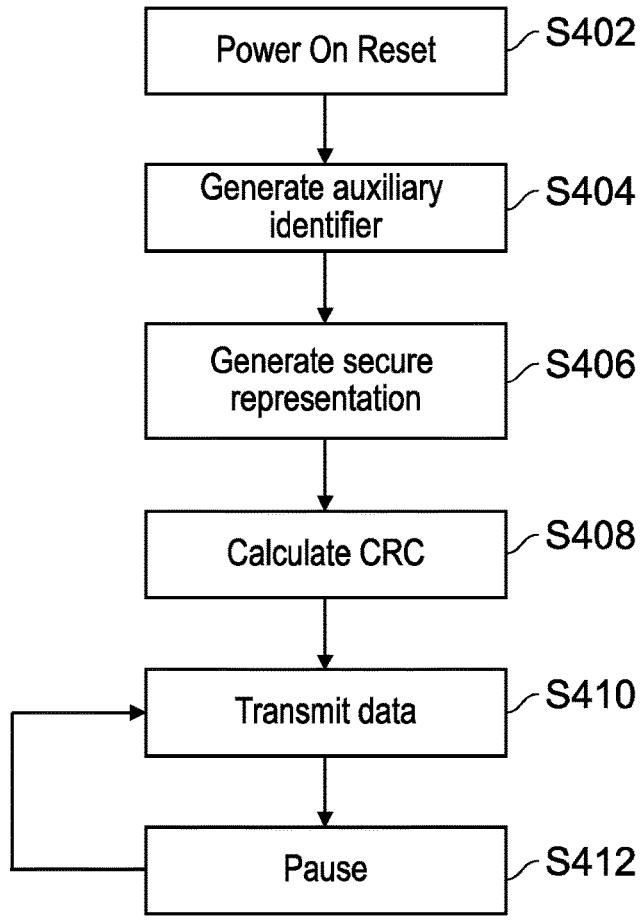
FIG. 4 provides a flow diagram of the operations of a passive TTO RFID tag operating in accordance with an example of the present disclosure.

Referring to FIG. 4, the operation illustrated relates to the logical processing that occurs within the RFID tag and which differentiates its operation from that of conventional passive TTO RFID tags. Consequently, FIG. 4 does not include the operations related to power management, transmission etc.; however, the skilled person would be aware of how to implement such functionality.

Firstly, at step S402, upon receipt of power, if required, the logical components of the RFID tag are reset in order to clear data from previous operations.

At step S404, an auxiliary ID is generated, where the auxiliary ID may be generated as a random number, a sequential number or any other number which has a chance of repetition meeting a predefined requirement such that repeated use of an auxiliary ID with respect to a tag ID can be detected. In the present disclosure, random and sequential auxiliary ID are focused upon, where each has particular advantages and therefore may be suitable for different applications.

With respect to randomly generated auxiliary IDs, these may require more complex logic on a tag to be generated but they may not require non-volatile memory since a random number may not be dependent on the previously generated numbers. In contrast, generating sequential numbers (e.g. using a counter) will likely require less complex logic but will require some non-volatile memory so that the counter can continue to generate sequential numbers in order even when power to the chip has been removed. Although sequential auxiliary IDs may require increased memory, they will have a reduced chance of repetition because a repeatedly generated number will only occur once all possible numbers have been generated. For example, if the auxiliary ID is 16-bits long, there are a maximum 65536 possible values that the auxiliary ID may take, and thus up to 65536 read operations may be performed before a repeated value will be generated. In contrast, with a randomly generated number, although relatively low, there is a possibility that a repeated value (previously generated value) will be generated at each generation, with the probability increasing with the number of reader operations.

Figure 5:
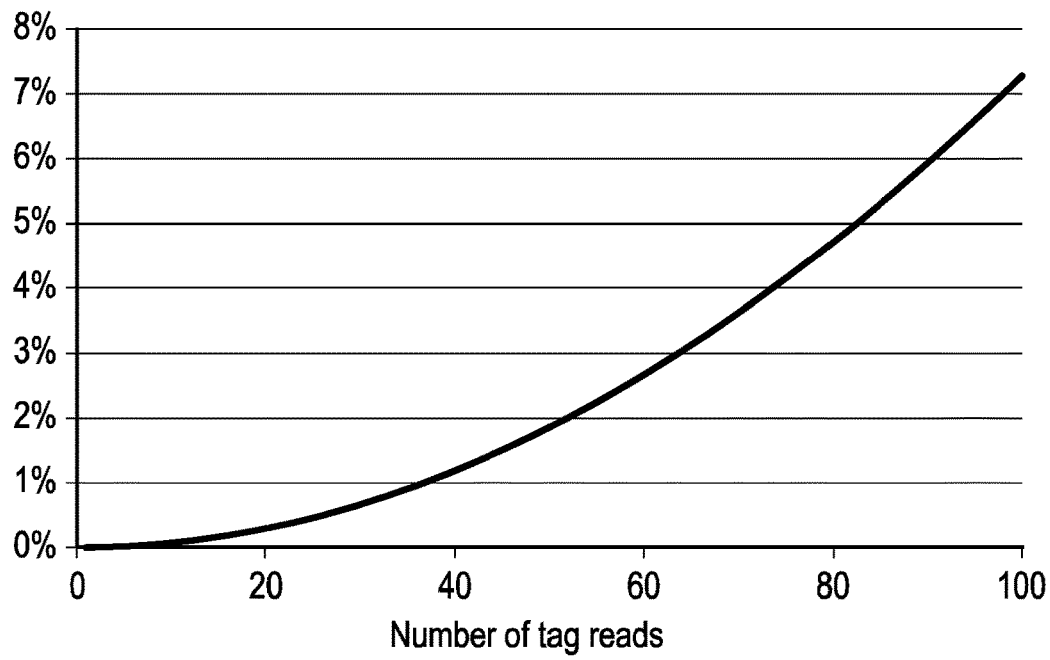
FIG. 5 provides a graph illustrating the probability of a repeated value being generated by a 16-bit random number generator.

FIG. 5 illustrates the probability of a previously generated random number being generated, where the probability of a repeated value being generated is shown for an increasing number of generations (tag reads) for a 16-bit random auxiliary ID. Although the likelihood of a repeated value being generated is greater than that of a sequential counter, if a repeated value were to occur, the generation can be repeated in order to obtain another auxiliary ID which has not previously been generated. Although a repeated auxiliary ID may also indicate that a tag is not authentic, a repeated tag read of a falsified tag will most likely result in the same auxiliary ID being used again, thus indicating that the tag may not be authentic. As is explained in more detail below, the detection of a repeated auxiliary ID is performed at the receiver-side. In order to reduce the likelihood of auxiliary ID repetitions, the length of the auxiliary ID can be chosen based on the expected number of read operations during the lifetime of a tag.

At step S406 of FIG. 4, once the auxiliary ID has been generated, a secure representation i.e. a cryptographic representation is generated. This secure representation may take any form which prevents an unauthorised tag/user from recreating the secure representation and which provides an indication that the secure representation has not been generated by an authentic tag. In the present disclosure, although hashing and encryption are the two approaches primarily considered for the generation of the secure representation, the present disclosure is not limited to these approaches. The data included in or used to generate the secure representation may include one or more of the tag ID, the auxiliary ID, private information of the tag, a private/proprietary algorithm etc. Regardless, of the exact cryptographic approach used, at the reader-side, the authenticity of the tag read is based upon some form of comparison between the secure representations and/or the data represented thereby or the ability of the reader-side to access the data included in the secure representation.

At step S408, a CRC or other error detection/correction values are generated based on some of or all of the data which is to be transmitted to the reader. However, in some examples, no form of error detection and/or error correction may be used.

At step S410, stored data (e.g. manufacturer ID, data format, tag ID) and the generated data (e.g. secure representation, auxiliary ID, CRC etc.) are transmitted to the reader, where the data will include at least one of a secure representation, tag ID and the auxiliary ID or a representation thereof, where depending on the exact implementation, the tag ID and the auxiliary ID may be non-encrypted i.e. provided by unsecured representations, included in the secure representation or will have been used to generate the secure representation. The data is transmitted as part of the payload data 306 of FIG. 3. However, the length of the data which is transmitted may vary and is not limited to 12 bytes as illustrated in FIG. 3. For example, the length of the payload may vary depending on the length of the tag ID, the length of the auxiliary ID and the type of cryptographic approach used to generate the secure representation. The transmitted data may also include further information of any form, such as URLs and data formatting information for example.

Once the transmission is complete, the RFID tag may continue to transmit the same data with a predetermined delay at step S412 whilst it still has power to operate or, alternatively, may transmit the data only once and a new generation process initiated after the transmission of data if the tag still has power to operate.

The processing that takes place at the RFID tag is not limited to the steps of FIG. 4 but may include additional steps or fewer steps. For example, in some implementations a CRC may not be generated and/or there may not be a pause between transmissions of the data. Likewise, in some implementations upon first receiving power only a subset of memory may be reset. For example, if a counter is being used as the auxiliary number generator it may not be required to reset the counter upon receipt of power.

FIG. 6 provides a flow diagram illustrating the reader-side steps for receiving and validating data of an RFID tag in accordance with an example of the present disclosure. As is explained in more detail below, some of the steps of FIG. 6 may be performed by a reader device itself or a reader device operating in conjunction with an external service provider or server.

Firstly, at step S602 the reading process is initiated via a user command or a user action such as a tap of the reader near or on the RFID tag for example, or via an automated process, and power is then transmitted to the RFID tag.

At step S604, the reader receives the data transmitted from the RFID tag, where the data will include a secure representation, and zero or more representations of the tag ID and the auxiliary ID or an indication thereof, where depending on the exact implementation, the tag ID and/or the auxiliary ID may be non-encrypted/unsecured, included in the secure representation or will have been used to generate the secure representation. Once the data has been received, any error detection/correction implemented may be performed and the information in the received data extracted if no errors are detected. If an error(s) is detected, the reader may reperform the reception of data by either maintaining power to the RFID tag and awaiting a repeated transmission, or by requesting the user to reperform the read operation, for example, by requesting another tap.

At step S606, once the data has been extracted, validation of the tag data is performed based on the secure representation and the auxiliary ID and/or the data represented thereby, such as the auxiliary ID or tag ID. The exact validation process varies depending on the nature of the secure representation, where the different approaches to validation are described in more detail below. Nevertheless, the validation process may take place at the reader device, via a combination of functionality provided by the reader device and an external server, or be completely performed by an external server. For example, the reader may transmit all of the received data to a server and the server then performs the validation; the reader may extract only certain data from the received data and pass this to the server in order to obtain information necessary for performing the validation at the reader e.g. the reader may simply obtain the required information from an externally stored database; or the reader may store all required information to perform validation in local storage and thus perform the validation itself. Alternatively, the data read from the RFID tag may include a URL or other address to which the reader passes the received data for verification of the tag read.

At step S608, the validation result returned by the reader is determined, and if the result of the validation is negative, the tag read is deemed to be invalid at step S610. If the result of the determination is positive, the tag read is deemed to be valid at step 612. At the step 610, the reader may reperform the read operation either automatically or in response to a user input. In both steps S610 and S612, the result of the validation/verification may be indicated to the user of the reader in some manner, such as a visual or audio indication or a combination thereof. However, in some examples, further information from the tag may be provided to the user or additionally information retrieved from a server. Alternatively, the validation results may not be provided to the user but instead stored on a server for later use or analysis by a central authority. For example, a central authority may wish to track goods with fake or cloned tags but not alert the user to the authenticity of the goods which the tag is associated with.

Hashing-Based Secure Representation

In one example of the present disclosure, a hashing algorithm is used to generate the secure representation, where the secure representation is a hash of the tag ID, the auxiliary ID, and a piece of private information such as a secure key which is securely stored/processed at the tag.

Figure 7:
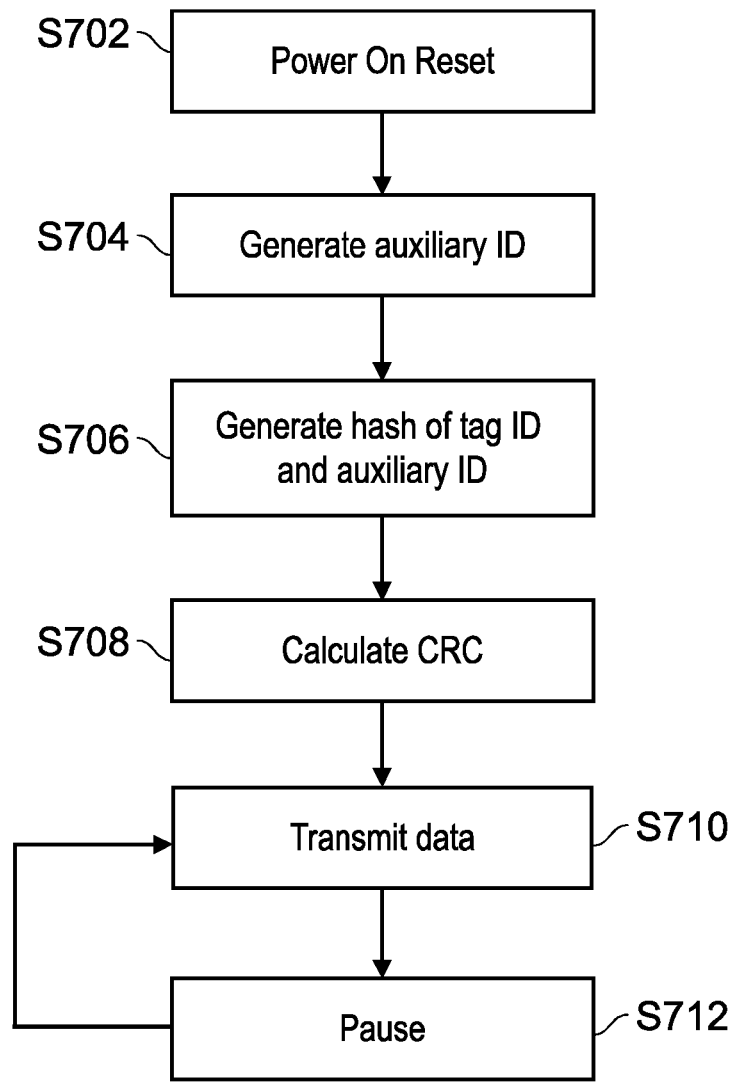
FIG. 7 provides a flow diagram of the operations of a passive TTO RFID tag operating in accordance with an example of the present disclosure.

FIG. 7 illustrates the processing that takes place at the RFID tag in accordance with the present example. Steps S702, S704, S708, and S712 are equivalent to those of S402, S404, S408, and S412 of FIG. 4 and therefore they will not be described in further detail here. However, step S706 is a specific implementation of step S406 where the secure representation is generated based on a hashing function.

In accordance with the present example, in addition to storing a tag ID and generating an auxiliary ID, the tag also stores a private/security key or equivalent which is not permitted to be transmitted unsecured (e.g. in plain text) from the tag or is not permitted to be read externally, and is also known to the service provider which performs the validation of the tag. For example, the private key may be stored in secure ROM at the tag with various approaches to preventing unauthorised access to the private key implemented, such as the use of a secure processing element for example. The private key may be uniquely associated with the tag ID, associated with all or a subset of tags from a particular owner/manufacturer, or may be one from a pool of private keys.

When the secure representation is generated, the tag ID, the generated auxiliary ID and the private key are input into a hash function and a hash output, such that the hash value cannot be reached without the knowledge of the private key. The hashing algorithm may be any hashing algorithm that provides the required level of security, where the level of security may be a trade-off against complexity of the tag. For example, the SHA-256 hashing algorithm may be used, where the hash may be truncated depending on the number of bits allocated to the secure representation in the transmission format. Similarly, the hashing algorithm chosen may also be dependent on the number of input bits i.e. the combined or truncated length of the tag ID, auxiliary ID and private key.

Subsequently, at steps S708 and S710 the generated hash, and unsecured representations of the tag ID and the auxiliary ID (e.g. raw data) are determined to be the payload data, the CRC is performed (if present), and the payload data along with the remaining data transmitted to the reader.

As is explained in more detail below, the generated hash value can be compared against a counterpart hash which has been generated by an authorised reader based on the received tag ID, auxiliary ID and counterpart private key corresponding to the tag ID that the authorised reader has access to. If the two hashes match, it can be assumed that that the secure representation has been generated by an authentic tag. However, this process does not detect repeated uses of a same hash value and auxiliary ID without a further check of the auxiliary ID against previous uses.

Figure 8:
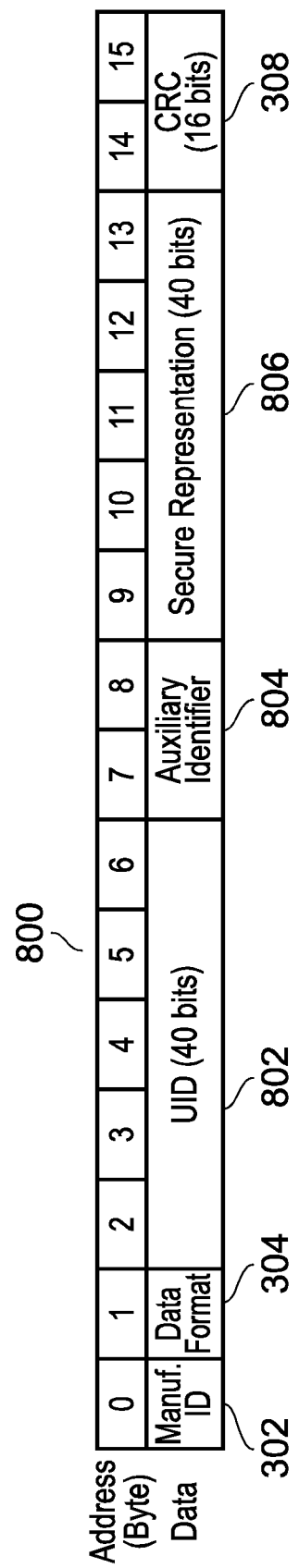
FIG. 8 provides a diagram of the data structure of a transmission by a passive TTO RFID tag operating in accordance with an example of the present disclosure.

FIG. 8 illustrates an example data format for the transmission from the RFID tag to the reader in accordance with the hashed-based present example. The structure of the data format 800 of FIG. 8 is similar to that of the NFC barcode of FIG. 3 but where the payload data is formed from the unsecured tag ID (UID) 802, the unsecured auxiliary ID 804 and the secure representation 806. Although the tag ID, auxiliary ID and the secure representation are shown to be 5, 2, and 5 bytes long respectively, the present technique is not limited to this and the length of the overall transmitted data and/or individual fields may vary depending on the system requirements, such as the level of security, the number of tag IDs required, and the repetition probability of the auxiliary ID for example. For instance, in some examples, the secure representation may be truncated in order to reduce its size whilst still allowing increased size tag IDs. Furthermore, the arrangement of the fields within the data format may also vary, and in some examples, the data format may differ from that of the NFC barcode in order to increase the data capacity or to introduce different functionality. However, by using a data format equivalent to the NFC barcode, existing devices may receive and identify the payload portion and CRC portion etc. without requiring significant changes in their behaviour to be made. Also, information such as the Manufacturer ID, Data Format, and CRC may not be included or included in an alternative manner. For example, with regards to the CRC, the present technique is not limited to including error detection and/or correction information nor is the error detection limited to CRC, for example, parity bits or error correction codes can be used.

Figure 9:
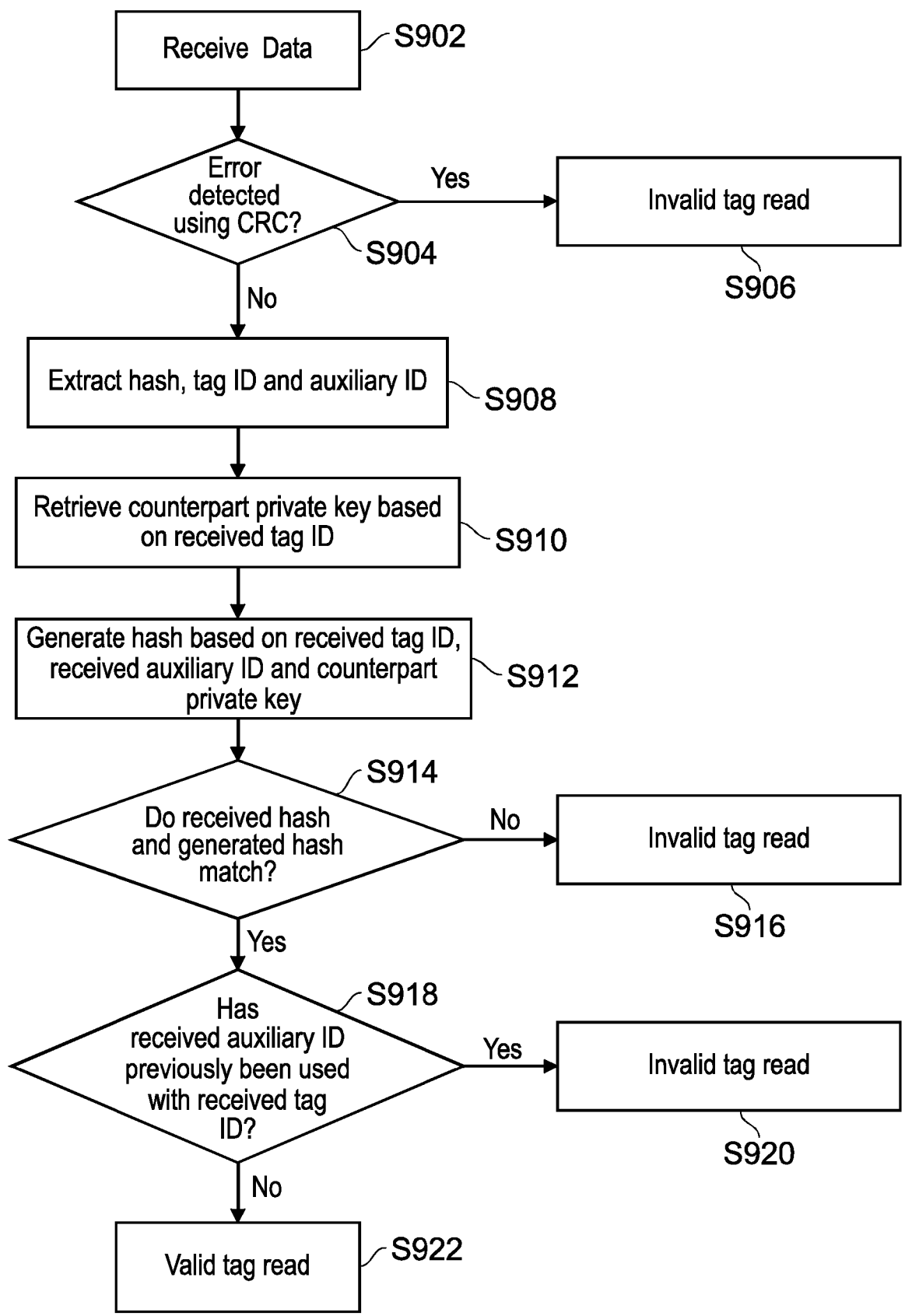
FIG. 9 provides a flow diagram of the receiver-side operations in a passive TTO RFID system operating in accordance with an example of the present disclosure.

FIG. 9 illustrates the processing that occurs at the reader-side in accordance with the present example, where the steps of FIG. 9 are similar to those of FIG. 6 but specified in more detail and with specific regard to hash-based implementation.

At step 902, the data is received from the RFID tag, where the data includes at least the tag ID, auxiliary ID, and the hash value generated on the basis of the tag ID, auxiliary ID and the private key of the tag. The data may also include bits for CRC error detection and also the other data specified described with reference to FIG. 8.

If the received data includes CRC bits, at step S904, error detection is performed by the reader on the received data using the CRC information. If errors are detected, an invalid tag read indication may be provided to the user at step S906, and in some examples a request for performing the read operation again presented. Alternatively, in other examples if the same data is continuously transmitted by the tag whilst it has power, the reader may receive another transmission of the data in an attempt to correctly receive the data.

If the data has been correctly received, at step S908 the hash value, the tag ID and the auxiliary ID are extracted from the received data.

At step S910, a counterpart key corresponding to the private key of the tag is retrieved based on the received tag ID or other information of the tag, such as a manufacturer ID. The counterpart key may also be preset in the reader or server for the type of tags being read or the items with which the tags are associated.

At step S912, a counterpart hash is generated based on the received tag ID, the received auxiliary ID and the retrieved counterpart private key, and using the same hashing algorithm as implemented at the tag.

At step S914, the received hash and the counterpart hash are compared. If the hashes do not match, then the tag read is deemed to be invalid at step S916 since the hash generated at the tag has either been generated using an incorrect private key or the received hash does not correspond to the received tag ID and/or auxiliary ID.

If the two hash values match, at step S918, it is then determined whether the received auxiliary ID has previously been used in connection with the received tag ID. If the auxiliary ID has previously been used in connection with a read operation of the tag ID, then the tag read is deemed to be invalid at step S920. If the auxiliary ID has not previously been used, then the tag read is deemed to be valid and the received tag ID to be the identity of an authentic tag at step S922.

In this example, given that the tag ID is transmitted to the reader in an unsecured form, the identity of a tag may still be read even if the tag read verification/validation fails/is negative.

Steps S904 to S922 may be performed either by a reader, a server or a combination thereof. For instance, in some examples, the entirety of the data received from the tag may be passed to the server and all of steps S904 to S922 performed by the server and only the valid/invalid results passed back to the reader. Alternatively, only the tag ID and the auxiliary ID may be passed to a server with the server determining whether the auxiliary ID has previously been used with the tag ID and the server passing the counterpart private key to the reader such that the reader generates the counterpart hash and determines the validity of the read accordingly. Alternatively, the server may generate the counterpart hash and pass this back to the reader for comparison with the received hash. In yet other alternatives, the reader may store a database synchronised with a server, the database including all private keys and previously used auxiliary IDs for all tag IDs such that all the steps of FIG. 9 are performed by the reader. Regardless of the entities that perform the steps of FIG. 9, the overall process in terms of counterpart key retrieval, hash generation, and comparison and determining previous usage of the auxiliary ID occur. However, depending on the exact implementation, various advantages may arise. For instance, when the generation of the counterpart hash takes place at the server, the private key is not transmitted by or known to the reader, thus reducing the possibility that the private key may be compromised. Similarly, given the large number of possible tag IDs, private keys and auxiliary IDs, central storage of such a database would likely be a more efficient implementation and relieve the reader of both processing and storage burdens. Similarly, by using a centralised, server-based approach, different data formatting and hashing/encryption algorithm may more easily be implemented in tags without extensive updating of reader functionality. In another alternative, the received data may be passed to a particular URL address which is stored in the reader or received from the tag.

With regards to detecting previous usage of the auxiliary ID, the reader or server may maintain a record of all auxiliary IDs previously used in connection with read operations for each tag ID, therefore allowing repeat usage of the auxiliary ID to be detected. Although there are a limited number of different auxiliary IDs, where this number depends on the length of the auxiliary ID, the number of possible auxiliary IDs can be chosen to be significantly larger than the expected number of readings of the RFID tags so that the probability of authorised but repeated uses of an auxiliary ID are reduced to a predetermined level.

Encryption-Based Secure Representation

As an alternative to generating the secure representation based on hashing, encryption may also be used, thus allowing, unlike hashing which is preferably a one-way function, the data within the secure representation to be retrieved directly from the secure representation. Furthermore, due to the wider range of available encryption algorithms, the use of encryption to generate the secure representation may also provide more flexibility in terms of implementation details.

Although the underlying principles are common between the hashing and encryption-based approaches, the data that is encrypted and the data which is transmitted to the reader unencrypted varies. Furthermore, there are also a number of different implementations of an encryption-based approach depending on the encryption algorithm used and preferences in terms of whether tag IDs are exposed during reading.

In the following, a number of alternative encryption-based approaches are described; however, the present disclosure is not limited to only these alternatives.

Figure 10:
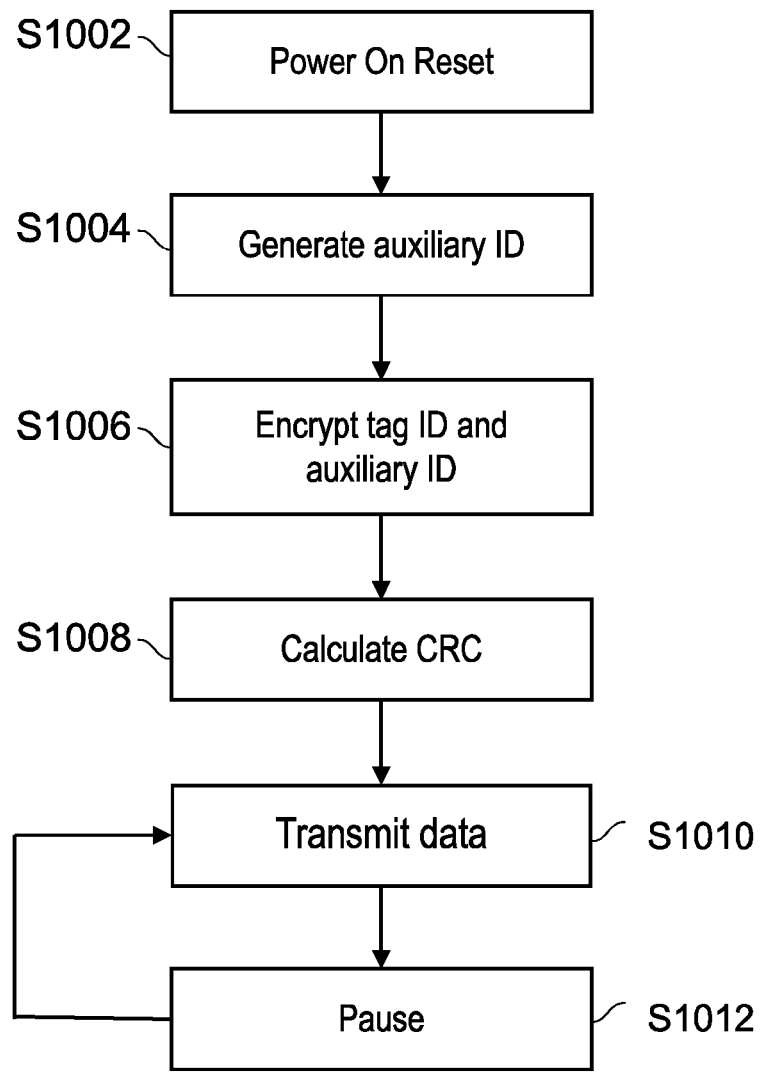
FIG. 10 provides a flow diagram of the operations of a passive TTO RFID tag operating in accordance with an example of the present disclosure.
Figure 11:
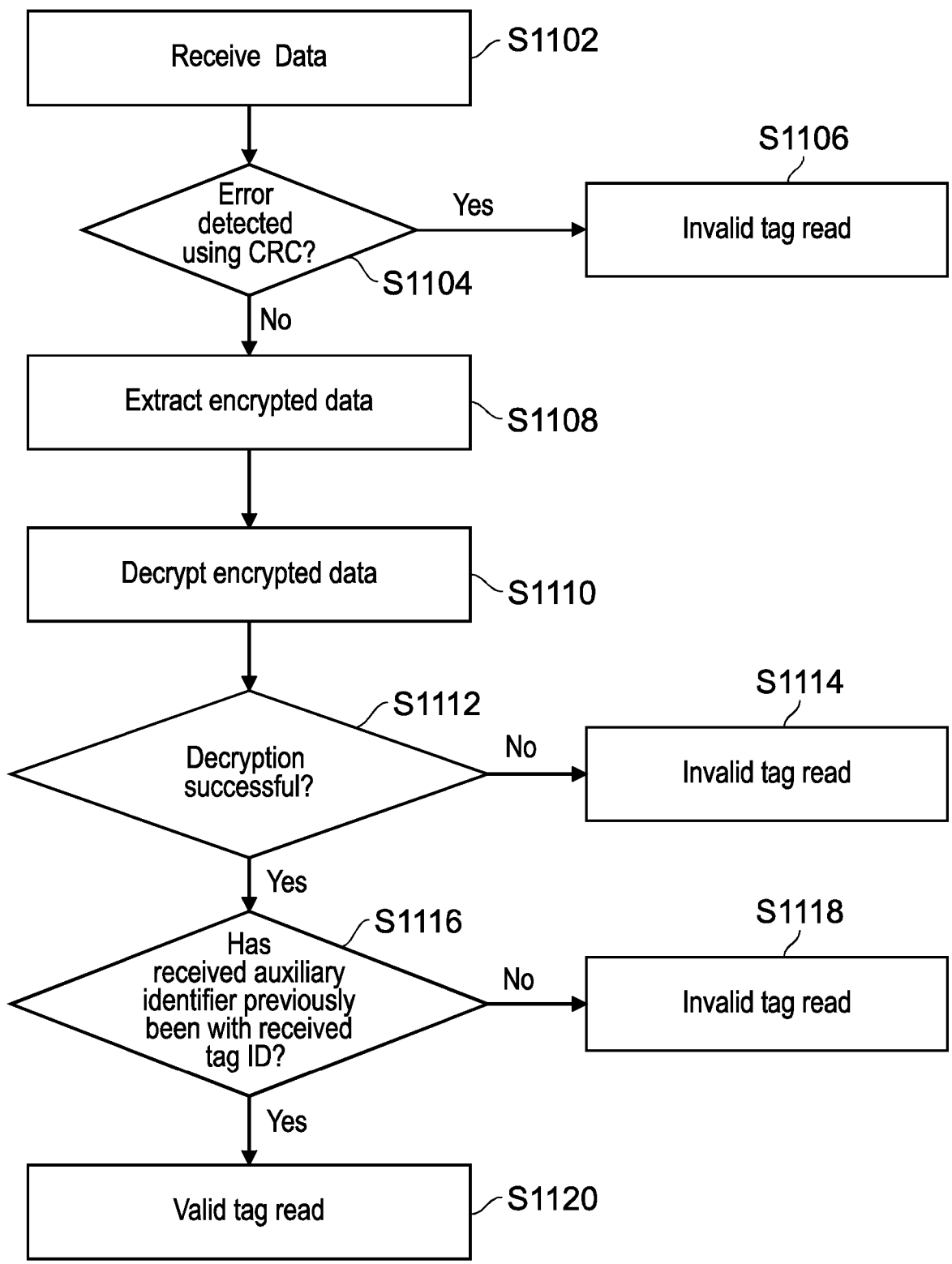
FIG. 11 provides a flow diagram of the receiver-side operations in a passive TTO RFID system operating in accordance with an example of the present disclosure.

FIGS. 10 and 11 provide illustrations of the operation of a first encryption-based approach, where FIG. 10 illustrates the operation of the tag and FIG. 11 illustrates the reader-side operation.

In FIG. 10, the steps of S1002, S1004, S1008, S1010, and S1012 are equivalent to steps S402, S404, S408, S410, and S412 of FIG. 4 and therefore they will not be described in further detail here. However, step S1006 is a specific implementation of step S406, where the secure representation is generated based on encryption.

More specifically, at step S1006, the tag obtains the tag ID and the generated auxiliary ID and encrypts these using either a private/security key securely stored in the tag or a private or unique algorithm. The encrypted version of the tag ID and the auxiliary ID is then transmitted to the reader as the payload data where it can be decrypted and the tag validated as described with reference to FIG. 11. The encryption algorithm may be any algorithm that provides the required level of security, where the level of security may be a trade-off against complexity of the tag. For example, a DES encryption algorithm may be used for lower security application and triple DES for higher security applications, however, other encryption protocols may also be used. The output of the encryption algorithm may also be truncated depending on the number of bits allocated to the secure representation in the transmission format and the manner in which the comparison at the reader or server is performed. Similarly, the algorithm chosen may also be dependent on the number of input bits i.e. the combined length of the tag ID and auxiliary ID. The encryption algorithm may also be chosen based on the method of authentication at the reader. For example, if the encrypted values are being compared, a symmetric key algorithm may be preferred whereas if the secure representation is being decrypted, an asymmetric key algorithm may be preferred, such as an RAS based algorithm.

FIG. 11 illustrates an example of the validation/verification process for a tag at the reader-side in accordance with the present disclosure when the first encryption-based approach is used to generate the secure representation. Steps S1102 to S1106 are equivalent to steps S902 to S906 of FIG. 9 and therefore they won't be explained again here.

At step S1108 the encrypted data is extracted from the received data.

At step S1110 the encrypted data is decrypted using either a private/public key corresponding to the key used at the tag to encrypt the data or using a decryption algorithm corresponding to the private or unique encryption algorithm used at the tag, where the corresponding key/algorithm may be identified using another identifier transmitted from the tag (e.g. manufacturer ID), or a key preset in the reader or server for the tags being read or the goods with which the tags are associated for example.

At step S1112 the decryption is determined to be successful if the received data has been correctly decrypted into a recognised tag ID and auxiliary ID or another value that indicates as such.

If the decryption is not successful, the tag read is deemed to be invalid at step S1114.

If the decryption is successful, the resulting auxiliary ID is compared with auxiliary IDs which have previously been used with the tag ID, and if the auxiliary ID has not previously been used, the tag read is determined to be successful at step S1120.

If the auxiliary ID has previously been used, the tag read is determined to be invalid at step S1118.

By virtue of this approach, both the tag ID and the auxiliary ID are not exposed during reading of a tag, therefore making it more difficult for the tag data to be copied without physical access or destruction of the tag.

As described with reference to FIG. 9, the various steps of FIG. 11 may be performed at the reader, a server in communication with the reader or a combination thereof. However, as for the hashing-based approach, security may be enhanced if a server-based approach were to be used since the various keys/algorithms used to secure the data would not be required to be distributed to the reader devices.

Compared to the hashing-based approach, there is less duplication of data in this encryption-based approach since the tag ID and the auxiliary ID are only transmitted in encrypted form, thus potentially allowing increased length tag IDs and auxiliary IDs whilst still utilising the NFC barcode data format.

Figure 12:
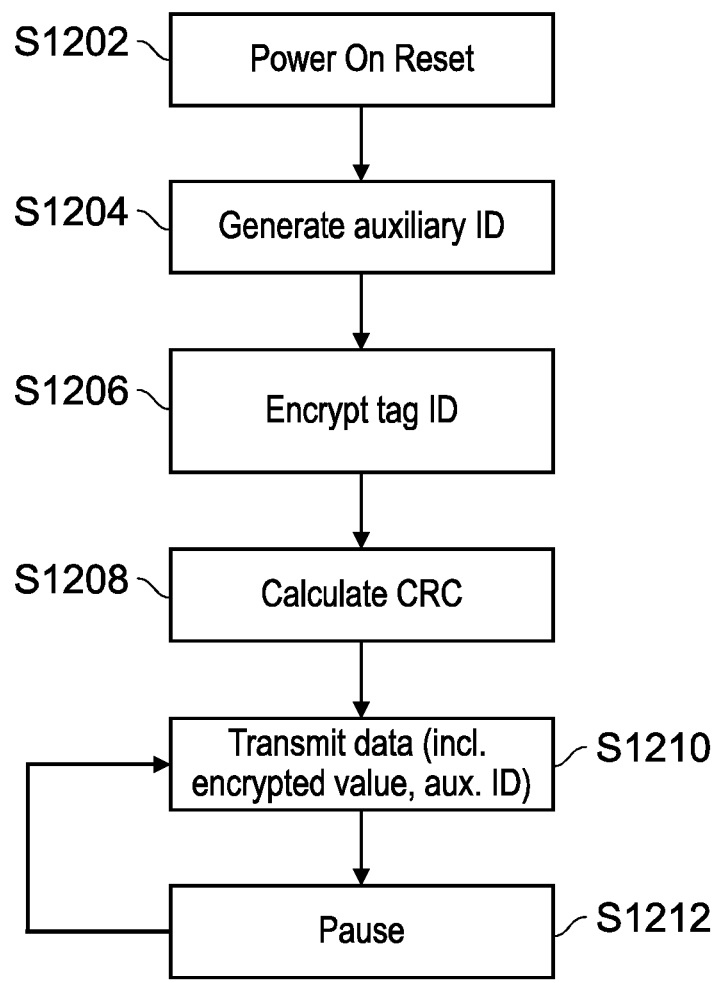
FIG. 12 provides a flow diagram of the operations of a passive TTO RFID tag operating in accordance with an example of the present disclosure.

FIG. 12 illustrates the operation of an RFID tag in a second example encryption based approach, where an alternative form of encryption is used.

In FIG. 12, steps S1202, S1204, S1208, and S1212 correspond to steps S402, S404, S408, and S412 of FIG. 4 and therefore they will not be described in further detail here. However, step S1206 is a specific implementation of step S406 where the secure representation is generated based on a second encryption-based approach.

More specifically, at step S1206, the tag ID is encrypted using a password/key that has been generated using a protocol such as a HMAC based one time password (HOTP) protocol. More specifically, the encryption password is generated using a private key securely stored in the tag and the generated auxiliary ID, where the auxiliary ID is used in an analogous manner to how time may be used in a time based one time password (TOTP) protocol.

Subsequently, at step S1210, the encrypted value of the tag ID (secure representation) and an unencrypted version of the auxiliary ID are transmitted to the reader.

At the reader-side, the operation is similar to that illustrated in FIG. 11 but at step S1110, the received unencrypted auxiliary ID and a counterpart private key are used to generate the password using the HOTP protocol and decrypt the received encrypted value and obtain the tag ID. Upon successful decryption, the obtained tag ID can be used to identify the tag and to determine whether the auxiliary ID has previously been used, and therefore to determine the validity of the tag read.

In accordance with a third encryption-based approach, in order to enable the tag ID to be read regardless of the outcome of the validation process, whilst still being able to detect repeated use of an auxiliary ID, the tag ID is included in non-encrypted/unsecured form in the transmitted data.

Figure 13:
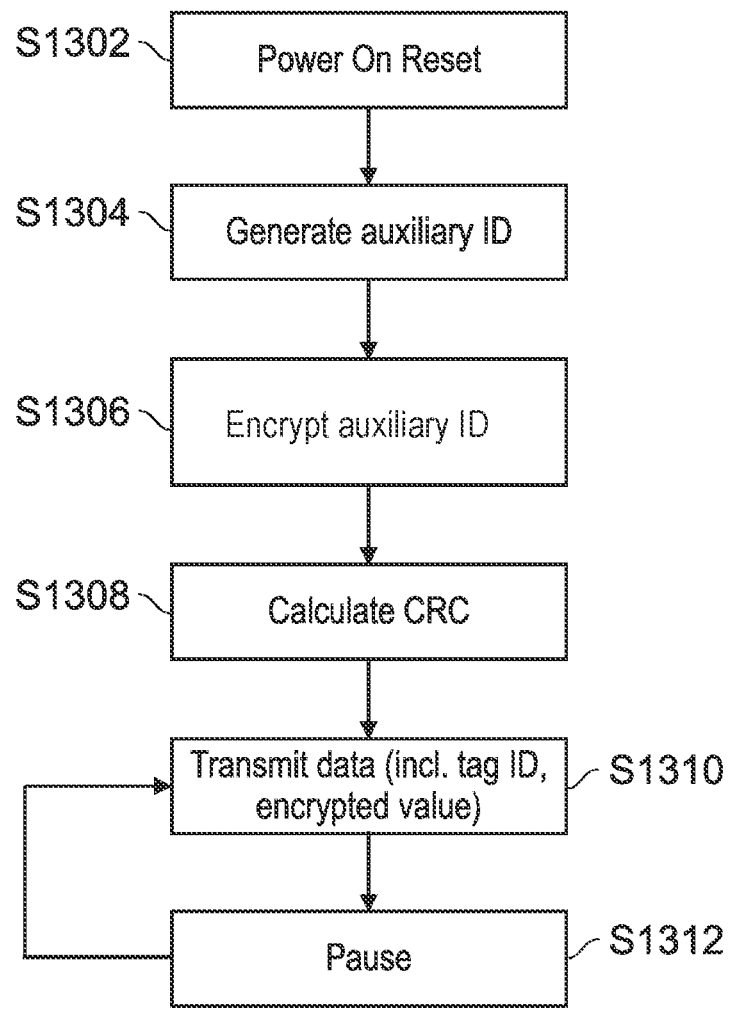
FIG. 13 provides a flow diagram of the operations of a passive TTO RFID tag operating in accordance with an example of the present disclosure.

FIG. 13 illustrates the operation of a tag in the third and possibly further encryption based approaches which may utilise aspects of the first and/or second encryption based approaches but the transmitted data includes the tag ID in an unencrypted form.

In FIG. 13, steps S1302, S1304, S1308, and S1312 correspond to steps S402, S404, S408, and S412 of FIG. 4 and therefore they will not be described in further detail here.

In the approach illustrated in FIG. 13, the tag stores a private ID or private key and utilises this to encrypt the generated auxiliary ID at S1306. The encrypted auxiliary ID is then transmitted S1310 along with the unencrypted tag ID to the reader.

At the reader-side, the operation is similar to that illustrated in FIG. 11 but at step S1110 the private key corresponding to the tag ID or other identifier is retrieved and the encrypted value decrypted to obtain the auxiliary ID. It can then be determined at step S1116 whether the auxiliary ID has previously been used with the tag ID and the validation determined accordingly.

Alternatively, the private key and the generated auxiliary ID may be used to generate a password using a HOTP protocol. This password is then transmitted along with the unencrypted auxiliary ID and the tag ID. Subsequently, at the reader a counterpart private key corresponding to the tag ID is retrieved and the password generated using the HOTP protocol using the retrieved private key and the received auxiliary ID. If the passwords match, then it can be confirmed that the password has been generated by an authentic tag, and if the auxiliary ID has not previously been used it can be determined that the received data is not previously read/used data.

As another alternative, the private key and the generated auxiliary ID may be used to generate a password using a HOTP protocol, and the password then used to encrypt the tag ID and/or the auxiliary ID. The encrypted value is then transmitted along with the unencrypted auxiliary ID and the tag ID. Subsequently, based on the received tag ID the reader can retrieve the counterpart private key, generate the password and then decrypt the encrypted value. If the decrypted value matches the received tag ID and/or auxiliary ID, it can be confirmed that data has originated from an authentic tag, and if the auxiliary ID has not previously been used it can be determined that the received data is not previously read/used data.

Figure 14:
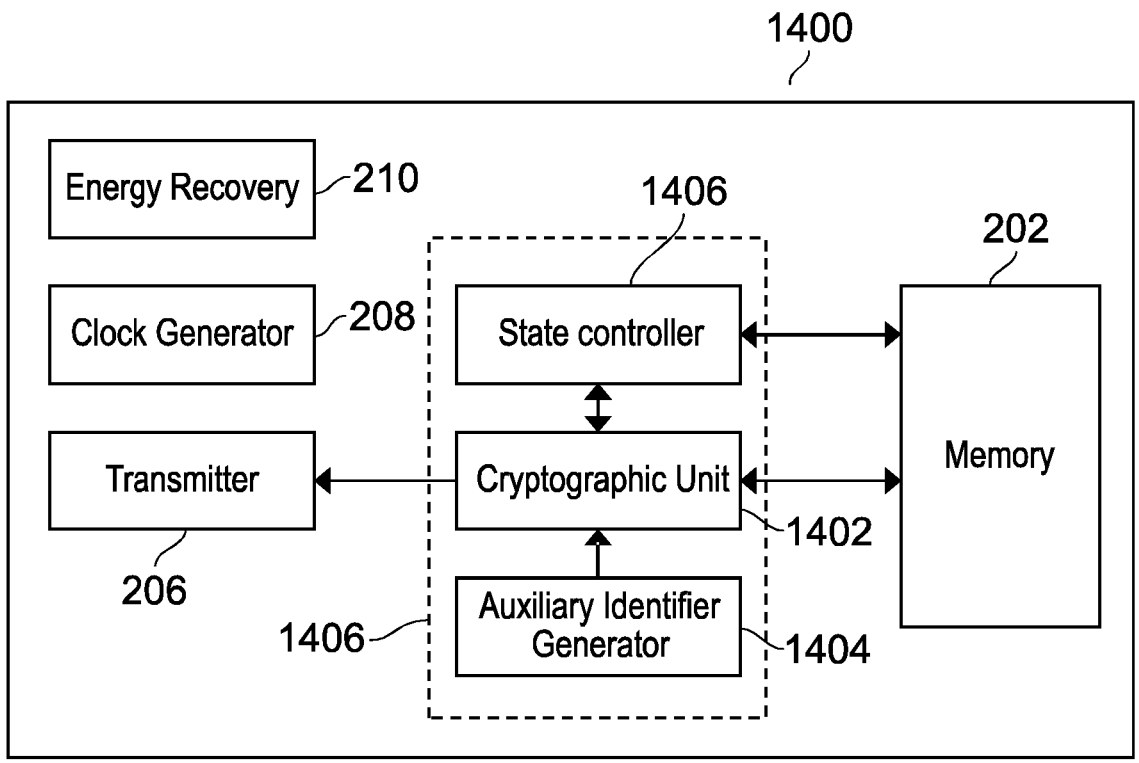
FIG. 14 provides a schematic diagram of a passive TTO RFID tag in accordance with an example of the present disclosure.

FIG. 14 provides schematic diagram of a RFID tag 1400 in accordance with an example of the present disclosure, where the various elements of the RFID tag may be configured to perform any of the approaches set out above.

The RFID tag 1400 is similar to that of FIG. 2 and thus corresponding elements will not be explained in detail here. However, RFID tag 1400 includes a number of further elements used to implement the functionality of the techniques described above. In particular, the RFID 1400 includes a cryptographic unit 1402 for generating the secure representation, an auxiliary ID generator 1404 for generating the auxiliary ID, and a state controller 1406 for controlling the operation of and interaction between the elements of the tag. Although illustrated as separate elements, the cryptographic unit, state controller, and the auxiliary ID generator may be implemented in numerous different manners including logic and instructions for execution by a processor or controller. Furthermore, the state controller, cryptographic unit and the auxiliary ID generator may also be included in a single processor unit 1406, and the memory 202 may include both conventional ROM or PROM and secure memory for the storage of a private key for example.

The performance of a tag such as that of FIG. 14 will be determined by the complexity of the logic/processing which is required to be performed for a read operation. For example, initial transmission will be delayed until encryption/hashing and CRC calculations are complete. However, the actual transmission time will be determined by the particular protocol being used e.g. a higher data rate protocol will result in decreased transmission time for a same amount of transmission data compared to a lower data rate protocol. Consequently, the total time to the completion of a transmission from initiation of the reading process will be dependent on internal logic speed, encryption/hashing complexity, and also the protocol being used.

Figure 15:
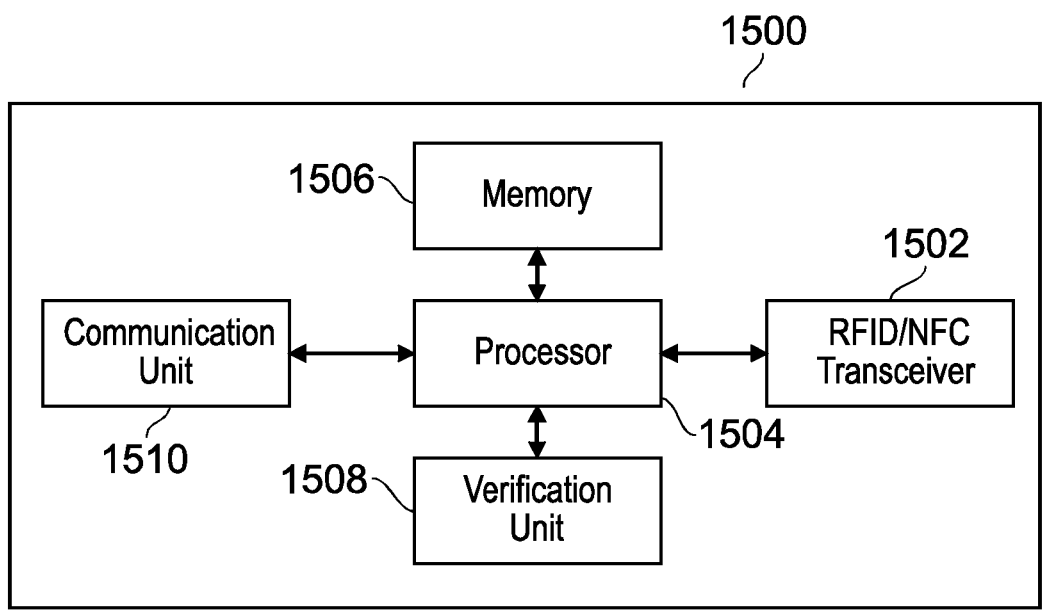
FIG. 15 provides a schematic diagram of an RFID reader in accordance with an example of the present disclosure.

FIG. 15 provides a schematic diagram of a RFID reader in accordance with an example of the present disclosure. The RFID reader 1500 may include an RFID/NFC transceiver 1502 for providing power to and receiving data from an RFID tag, a processor 1504 for controlling the overall operation of the reader, a memory 1506 for storing data received form an RFID tag and also for storing computer executable code for the running of the reader and various other functions of reader device, a verification unit 1508 for performing validation of tag reads if such functionality is implemented at the reader as opposed to the server, and a communication unit 1510 for communicating with, among other things, a server in order to pass data received from a tag for validation and/or to retrieve private keys etc. associated with a tag ID as set out above with reference to FIGS. 6, 8, and 10.

The above example embodiments are to be understood as illustrative examples of the invention. Further embodiments of the invention are envisaged. It is to be understood that any feature described in relation to any one embodiment may be used alone, or in combination with other features described, and may also be used in combination with one or more features of any other of the embodiments, or any combination of any other of the embodiments. Furthermore, equivalents and modifications not described above may also be employed without departing from the scope of the invention, which is defined in the accompanying claims.

The invention claimed is:

1. A method for operating a system for secure one-way RFID tag identification, the system comprising an RFID tag reader, and a Tags Talk Only (TITO) RFID tag including a memory storing a tag identifier of the TTO RFID tag, the method comprising:
generating, at the TTO RFID tag, an auxiliary identifier;
generating, at the TTO RFID tag, a secure representation based on the auxiliary identifier;
transmitting, from the TTO RFID tag and receiving at the RFID reader, one or more representations of the auxiliary identifier and the tag identifier including the secure representation; and
verifying an identity of the TTO RFID tag based on the received representations,
wherein the method includes only one-way data communication from the TTO RFID tag to the RFID tag reader,
wherein the TTO RFID tag stores a security key in a secure memory and the secure representation is generated based on the auxillary identifier and the security key, and
wherein the one or more representations includes an unsecured representation of the auxiliary identifier, and generating the secure representation includes;
generating a value based on the security key and the auxiliary identifier, and
encrypting the tag identifier using the generated value.

2. The method of claim 1, wherein the auxiliary identifier is one of a random number and a number in a predetermined sequence.

3. The method of claim 1, wherein verifying the identity of the TTO RFD tag includes
determining if the auxiliary identifier has previously been used in verification of the identity of the TTO RFID tag, and
returning an unverified result if the auxiliary identifier has previously been used.

4. The method of claim 1, wherein the value is generated using a one time password algorithm.

5. The method of claim 4, wherein verifying the identity of the TTO RFD tag includes:
retrieving a counterpart security key;
generating counterpart value based on the counterpart security key and the unsecured representation of the auxiliary identifier; and
decrypting the received secure representation using the counterpart value to obtain the tag identifier.

6. The method of claim 1, wherein the one or more representations include an unsecured representation of the tag identifier.

7. The method of claim 1, wherein the verification of the TTO RFID tag is performed at the RFID tag reader or by an external provider and a result of the verification returned to the RFID tag reader.

8. A method for operating a Tags Talk Only (TTO) RFID tag for secure one-way TTO RFID tag identification, the TTO RFID tag including a memory storing a tag identifier of the TTO RFID tag, the method comprising:
generating an auxiliary identifier;
generating a secure representation based on the auxiliary identifier;
transmitting one or more representations of the auxiliary identifier and the tag identifier including the secure representation,
wherein the method includes only one-way data communication from the TTO RFID tag,
wherein the TTO RFID tag stores a security key in a secure memory and the secure representation is generated based on the auxiliary identifier and the security key, and
wherein the one or more representations includes an unsecured representation of the auxiliary identifier, and generating the secure representation includes;
generating a value based on the security key and the auxiliary identifier, and
encrypting the tag identifier using the generated value.

9. A Tags Talk Only (TTO) RFID tag for secure one-way TTO RFID tag identification, the TTO RFID tag comprising
a memory configured to store a tag identifier of the TTO RFID tag;
an auxiliary identifier generator configured to generate an auxiliary identifier;
a cryptographic unit configured to generate a secure representation based on the auxiliary identifier; and
a transmitter configured to transmit one or more representations of the auxiliary identifier and the tag identifier including the secure representation,
wherein the ITO RFD tag is configured to perform only one-way data communication from the TTO RFID tag,
wherein the TTO RFID tag further comprises a secure memory configured to store a security key, and wherein the cryptographic unit is configured to generate the secure representation based on the auxiliary identifier and the security key, and wherein the one or more representations includes an unsecured representation of the auxiliary identifier, and the cryptographic unit is configured to generate the secure representation by generating a value based on the security key and the auxiliary identifier, and encrypting the tag identifier using the generated value.

10. The TTO RFID tag of claim 9, wherein the auxiliary identifier is one of a random number and a number in a predetermined sequence.

11. An RFID system for secure one-way RFD tag identification, the system comprising an RFID tag reader and a Tags Talk Only (TTO) RFID tag, wherein the system is configured such that:

the TTO RFID tag generates an auxiliary identifier;

the TTO RFID tag generates a secure representation based on the auxiliary identifier;

the TTO RFID tag transmits to the RFID reader, one or more representations of the auxiliary identifier and a tag identifier of the TTO RFID tag including the secure representation; and the RFID tag reader verifies an identity of the TTO RFID tag based on the received representations, wherein only one-way data communication from the TTO RFID tag to the RFID tag reader are utilized, wherein the TTO RFID tag stores a security key in a secure memory and the secure representation is generated based on the auxiliary identifier and the security key, and wherein the one or more representations includes an unsecured representation of the auxiliary identifier, and generating the secure representation incudes;

generating a value based on the security key and the auxiliary identifier, and encrypting the tag identifier using the generated value.

* * * * *